Patented Mar. 30, 1926.

1,578,339

UNITED STATES PATENT OFFICE.

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY.

PRODUCTION OF AVAILABLE PHOSPHATE.

No Drawing.    Application filed October 20, 1922.    Serial No. 595,825.

*To all whom it may concern:*

Be it known that I, HERBERT H. MEYERS, a citizen of the United States, residing at Pittsburgh, in the county of Allegheny and State of Pennsylvania, have invented certain new and useful Improvements in the Production of Available Phosphate, of which the following is a specification.

My invention relates to a new process or method for the production of so-called "available" phosphate from phosphate rock whereby it may be used to advantage for fertilizing purposes.

So far as the benefits of the new process are reflected in the product, it may be mentioned that the latter is not an acid phosphate, and in fact may be slightly alkaline; the employment of the process resulting in a higher grade or greater percentage of available phosphate than accrues in the production of acid phosphate.

The product of the new method can be mixed with all types of fertilizers without danger of having its phosphate revert and without injuring the quality of such other fertilizers.

The phosphate resulting from such improved process is cheaper to make than acid phosphate, and, because of its lack of acid qualities, it may be handled in bags without danger of rotting the latter.

The practice of the new method permits the employment of a smaller and cheaper plant than is needed for the manufacture of acid phosphate and a poorer grade of phosphate rock may be used than is required in the production of the acid phosphate.

Heretofore, numerous attempts have been made to render the phosphate of phosphate rock available for fertilizer purposes by various fire or heat treatments, but up to the present time, however, so far as I am advised, none of these methods have met with commercial success, but rather they have failed, either because the conversion to available phosphate was not complete enough, or because too much reagent or fuel was required to produce the desired results economically.

The general method prescribed in such cases is to mix a certain amount of alkali metal salt with the phosphate rock, either with or without the addition of carbon or carbonaceous materials, and water, and then to subject the mixture to temperatures between 1400° C. and 1500° C., usually in a rotary kiln, such as is commonly employed in Portland cement manufacture.

The alkali metal salts usually employed are either nitre cake which approaches in composition sodium bisulphate ($NaHSO_4$), or salt cake ($Na_2SO_4$), the amount prescribed varying considerably with a minimum of about fifteen per cent of the mixture.

When this procedure is followed on a commercial scale, the results are disappointing since the material is either discharged from the kiln in a nodular form or it reacts with the lining of the furnace, building up rings of fused material.

The nodules are usually in a semi-fused condition, their surfaces being often rather porous and thoroughly converted, but their interiors consist of strata of fused material containing a high percentage of the original reagents and a very low percentage of available phosphate.

Reaction with the refractories is of course fatal to high percentages of conversion to available phosphate.

The chemical reactions involved in such known process were not understood, but since the products showing high conversions usually contained approximately the same total content of pentoxide ($P_2O_5$) as the raw rock, it was assumed that, in the course of the treatment, the reagents were driven off by the heat and did not enter into the final constitution of the product.

In order to develop such method into a practicable, commercial process, whereby a maximum of conversion could be obtained with a minimum of reagent, fuel and time, which was the aim of this invention, it was necessary to study the chemical reactions involved, in order to arrive at a rational basis for determining the amout of reagents required, and to devise practical methods of overcoming the operating difficulties in the process, such as the tendency to fuse and to react with the refractories.

Phosphate rocks, in general, contain, besides calcium phosphates, fluorides, carbonates, silica and silicates, iron and aluminum compounds, etc. It was demonstrated that when phosphate rock was heated to a sufficient temperature for a period of time, fluorine was evolved and oxides and silicophosphates were formed in the mass which were somewhat soluble in the official ammonium citrate solution.

For instance, if a Tennessee brown rock containing approximately 10% silica and 3.5% fluorine is heated to about 1400° C. for an hour, nearly 50% of the phosphate will be rendered available by the official citrate method, and silica can be detected in the citrate solution; while the fluorine contents will be reduced to only a few tenths of a percent and the silica reduced correspondingly.

If a sufficient amount of an alkali metal compond be added to the raw rock in a form which reacts at high temperatures as if it were an oxide ($M_2O$) and the mixture heated for a period of time to about 1400° C., it will be found that between 85% and 95% of the phosphate is rendered soluble or available according to the official citrate method.

Moreover, if a proper amount of alkali metal salt has been used, it will be found that the product contains only traces of the acid radical which the alkali metal salt had contained, but a definite amount of alkali metal oxide combined in some manner with the other constituents of the product.

Further, it will be discovered that the citrate solution contains dissolved in it besides silica some of the alkali metal oxide.

In other words, the indications are that a double silico-phosphate of lime and alkali metal oxide has been formed which is comparatively readily soluble in the official citrate solution.

The amount of alkali metal oxide required bears a definite relation to the composition of the raw rock, and, therefore, a minimum theoretical requirement of alkali metal salt can be calculated for any given composition of rock.

For practical operation, however, it is not always expedient to use merely this minimum quantity of reagent, because of the effect upon the physical condition of the product, and on the time and temperature required for the completion of the reaction.

Experiment has shown that there is a definite relation between the three factors—amount of reagent, length of time of heating, and temperature for the reaction, and an economic balance can be struck among these factors to meet a given set of conditions.

The minimum temperature at which the reaction apparently takes place effectively is in the neighborhood of 1000° C., but, under most conditions, it would not prove economical to operate at this temperature as the time required to complete the reaction and the amount of reagent necessary are too great.

In short, a major portion, at least, of the reagent is decomposed and its acid radical is evolved as a gas while its alkaline radical enters into reaction with the constituents of the rock.

As long as the gases are evolved and swept away by a draft through the furnace, the reaction continues as the equilibrium is continuously displaced in favor of the further decomposition of the reagent, but any condition which interferes with the free evolution of gas and its removal from the sphere of reaction tends to retard the reaction and to permit an equilibrium being reached beyond which there is no further decomposition.

Local fusion, such as occurs in the nodules and clinkers produced by the usual process, causes a pressure in the interior of the nodules which hinders the free evolution of gas with the result that, while the reaction is fairly complete on the surface of the clinkers, in their interiors it is incomplete and there is a large percentage of undecomposed reagent.

Further, if the reaction is carried out in a closed receptacle instead of one through which a free draft passes, the reaction is very incomplete since the evolved gases are not removed and equilibrium is soon attained.

It will be apparent, therefore, that an initial porous or cellular structure of the charge which will permit of a ready and free evolution of gases and an easy penetration of the draft, is very desirable, and such a condition also assures a most intimate contact between the rock and reagent which is requisite for complete reaction since, in order to react, physical contact between the particles is necessary.

In the usaul processes the charge is introduced into the furnace in the form of a powdered mass, and it is quite possible that a certain amount of segregation occurs between the rock and reagent in its travel down the kiln.

Moreover, this method of introduction offers an excellent opportunity for reaction between the charge and the refractory furnace lining, which ruins both the lining and the product.

At the temperatures used in the furnaces, the phosphates and alkali salts are very reactive and will attack the furnace lining readily, producing complex compounds which hold the phosphate in a form insoluble in citrate solution.

On the other hand, if the charge is introduced into the furnace in the form of porous or cellular lumps, the surface of contact between it and the lining is very materially reduced and the ill effects of reaction with the refractory is correspondingly lessened.

Furthermore, experiment has shown that when a charge is treated in the form of porous or cellular lumps, the same results can be obtained at temperatures of from 100° C. to 200° C. lower than when a charge of identical composition is treated in the form of a powder for exactly the same length of time, this probably being due to the greater ease with which the reaction proceeds, since no "back pressure" in the mass needs to be overcome by an increase in temperature.

My invention involves in part the treatment of the charge in a porous or cellular condition and the advantages accruing therefrom are:

1st: A more intimate contact of reagents and rock.

2nd: A greater ease of evolution of gases.

3rd: The avoidance of local fusion.

4th: The less effect upon the refractories, and

5th: The lower temperature of reaction.

In practice, this porous or cellular structure is attained by sintering the charge before it is introduced into the reaction furnace, and, although this sintering may be performed in a number of ways, the preferred process is the Dwight and Lloyd method, in accordance with which the charge is intimately mixed with fuel and slightly moistened, spread in a uniform thickness upon a horizontal moving hearth, and the fuel ignited, the combustion being then sustained in the mass by a down draft through it. At the end of the travel of the hearth the fuel will have been consumed and the charge will be sintered together in a very desirable cellular condition, the temperatures attained in the mass on the hearth being controlled by the amount of fuel and draft.

In carrying out this new and improved process with the phosphate rock and reagent, it is usual to attain such temperatures on the hearth of the Dwight and Lloyd machine that the reaction between them is partially completed and the sintered material, therefore, contains available phosphates up to 50% of the total phosphate, a greater conversion not taking place since the time at which the mass is at the optimum temperature is too short.

The method of treatment of the sinter which is usually preferred, is to crush it to a uniform size of such dimensions that it will be heated through uniformly, and then to calcine it at the proper temperature for the required time in a rotary kiln or multiple hearth furnace.

The details of such preferred method are as follows:

If a Tennessee brown rock containing approximately 31.5 percent $P_2O_5$ and 10 percent silica is to be treated, there will be required an amount of reagent containing approximately 9.2 percent of the weight of the raw rock as $Na_2O$ if the calcining treatment is to be at about 1250° C. for 30 minutes or 1400° C. for 20 minutes.

This is equivalent to about 30 percent of the weight of the raw rock in the form of the average nitre cake or 21 percent of salt cake, these being probably the cheapest salts for use in this process.

Therefore 100 parts of the rock and 30 parts of nitre cake or 21 parts of salt cake are ground together intimately in a suitable type of mill and of course the finer the grinding the more intimate the mixing and the better the results. For practical purposes 95% through 100 mesh is adequate and even coarser material than this has proven satisfactory.

This charge is then mixed, according to the standard methods employed in the Dwight and Lloyd sintering practice, with fuel which is preferably either coke breeze or anthracite buckwheat, enough fuel being used so that the charge contains about 9% fixed carbon. Sufficient water is added with the fuel to cause the particles of the charge to adhere to each other, and the charge is then sintered under such conditions that the time between ignition and completion of the sintering is about 25 to 30 minutes.

The sinter as it is discharged from the Dwight and Lloyd machine is crushed to about ½ inch to 1 inch size and introduced into a rotary kiln of the usual type employed in cement practice where it is gradually heated to the reaction temperatures and the hot zone so extended that the desired temperature is attained for the required length of time, in the case being discussed, 1400° C. or more for 20 minutes, which is a common condition in cement practice, or 1250° C. for 30 minutes. The latter is a temperature somewhat lower than that employed in ordinary cement practice and it requires a slightly longer hot zone than is probably common.

The calcined material is cooled after it is discharged and is then ground to 95% through 80 mesh. It will contain approximately 31.5% total $P_2O_5$ of which 90% is available by the citrate method. The fineness of grinding the finished product influences the solubility in citrate, but for practical purposes the above fineness is sufficient.

Those skilled in this art will readily understand that this invention is not limited to the details of the process herein presented because these may be more or less radically changed without departure from the substance of the invention and without the sacrifice of any of its substantial benefits and advantages.

I claim:

1. The process of rendering the phosphate of phosphate rock available, consisting in sintering a mixture containing ground phosphate rock and an alkali metal salt thereby effecting a partial conversion of the phosphate, crushing such sintered mixture into porous lumps, and calcining such lumps at a sufficient temperature and for a period of time to complete the conversion of the phosphate into available phosphate.

2. The process of rendering the phosphate of phosphate rock available, consisting in sintering a mixture containing ground phosphate rock, an alkili metal salt, and carbonaceous material thereby effecting a partial conversion of the phosphate, crushing such sintered mixture into porous lumps, and calcining such lumps at a sufficient temperature and for a period of time to complete the conversion of the phosphate into available phosphate.

3. The process of rendering the phosphate of phosphate rock available, consisting in sintering a mixture containing ground phosphate rock, an alkili metal salt, and carbonaceous material under conditions such that about 25 to 30 minutes elapse between ignition and completion of the sintering thereby effecting a partial conversion of the phosphate, crushing such sintered mixture into porous lumps, and calcining such lumps at from about 1250° C. to about 1400° C. for a period of time sufficient to complete the conversion of the phosphate to available phosphate.

4. The process of rendering the phosphate of phosphate rock available, consisting in grinding together about 100 parts of phosphate rock and approximately 30 parts of nitre cake so that about 95% will pass through 100 mesh, mixing carbonaceous material with such charge so that the latter will contain approximately 9% fixed carbon, adding sufficient water to cause the particles to adhere to each other, sintering such charge under such conditions that the time between ignition and completion of the sintering is about 25 to 30 minutes, crushing the sintered material to about ½ to 1 inch size, calcining such crushed sintered material at a temperature of about 1250° C. to 1400° C. for a period of approximately 20 minutes to 30 minutes, and grinding the calcined material so that about 95% thereof will pass through a screen of 80 mesh.

In witness whereof I have hereunto set my hand and seal.

HERBERT H. MEYERS. [L. S.]